US010572667B2

(12) United States Patent
Min

(10) Patent No.: US 10,572,667 B2
(45) Date of Patent: Feb. 25, 2020

(54) COORDINATING POWER MANAGEMENT BETWEEN VIRTUAL MACHINES

(71) Applicant: Intel Corporation, Santa Clara, CA (US)

(72) Inventor: Alexander W. Min, Portland, OR (US)

(73) Assignee: Intel Corporation, Santa Clara, CA (US)

(*) Notice: Subject to any disclaimer, the term of this patent is extended or adjusted under 35 U.S.C. 154(b) by 816 days.

(21) Appl. No.: 15/086,106

(22) Filed: Mar. 31, 2016

(65) Prior Publication Data

US 2017/0285730 A1    Oct. 5, 2017

(51) Int. Cl.
   | | |
   |---|---|
   | *G06F 9/455* | (2018.01) |
   | *G06F 21/57* | (2013.01) |
   | *G06F 9/50* | (2006.01) |
   | *G06F 1/3234* | (2019.01) |

(52) U.S. Cl.
   CPC .......... *G06F 21/57* (2013.01); *G06F 1/3243* (2013.01); *G06F 9/45558* (2013.01); *G06F 9/5083* (2013.01); *G06F 2009/45579* (2013.01); *G06F 2009/45583* (2013.01); *G06F 2221/034* (2013.01); *Y02D 10/152* (2018.01); *Y02D 50/20* (2018.01)

(58) Field of Classification Search
   None
   See application file for complete search history.

(56) References Cited

U.S. PATENT DOCUMENTS

| | | | |
|---|---|---|---|
| 8,953,439 B1* | 2/2015 | Lin | G06F 11/1484 370/218 |
| 2005/0268298 A1* | 12/2005 | Hunt | G06F 9/4856 718/1 |
| 2009/0150896 A1* | 6/2009 | Tsushima | G06F 1/3203 718/104 |
| 2009/0240963 A1 | 9/2009 | Zimmer et al. | |
| 2010/0153945 A1 | 6/2010 | Barisal et al. | |
| 2010/0162242 A1 | 6/2010 | Grouzdev | |
| 2010/0235832 A1* | 9/2010 | Rajagopal | G06F 3/0605 718/1 |
| 2012/0278800 A1 | 11/2012 | Nicholas et al. | |
| 2013/0031552 A1* | 1/2013 | Kato | G06F 3/14 718/1 |
| 2014/0137104 A1 | 5/2014 | Nelson et al. | |
| 2014/0229686 A1* | 8/2014 | Tsirkin | G06F 9/45533 711/147 |
| 2014/0245298 A1* | 8/2014 | Zhou | G06F 9/455 718/1 |
| 2016/0371101 A1* | 12/2016 | Beale | G06F 3/061 |

OTHER PUBLICATIONS

PCT International Search Report, PCT Application No. PCT/US2017/017971, dated May 24, 2017, 4 pages.

* cited by examiner

*Primary Examiner* — Paul Yen
(74) *Attorney, Agent, or Firm* — International IP Law Group, P.L.L.C.

(57) ABSTRACT

A method and apparatus for cooperative power management by virtual machines is disclosed. In an example apparatus, a computing device includes a number of virtual machines (VMs), each sharing a resource with another of the VMs. A virtual machine monitor (VMM) includes a shared memory object accessible by the VMs, wherein the shared memory object comprises a current power state requested by a VM for the resource.

24 Claims, 5 Drawing Sheets

200

COORDINATING POWER MANAGEMENT BETWEEN VIRTUAL MACHINES

TECHNICAL FIELD

The present techniques relate generally to virtual machines (VMs) running on multicore processors. More specifically the present techniques relate to coordinating power management of shared cores in VMs.

BACKGROUND

In a virtualized computing environment, a software environment termed a virtual machine (VM) is configured to emulate a physical machine. A physical machine, often referred to as a "host," can be configured to implement multiple virtual machines (VMs) running operating systems that are termed guest operating systems. The physical machine includes system hardware, such as multiple physical processors (pCPUs). In addition, the physical machine includes memory and various other hardware devices, such as local storage and input/output functions.

A VM includes emulated devices, or "virtual" system hardware, that ordinarily includes virtual CPUs (vCPUs), virtual memory, virtual storage, virtual IO, and one or more other virtual devices. A VM typically will include both virtual system hardware and guest system software including virtual drivers used for various virtual devices.

The VMs are often instantiated, provisioned, and controlled by a layer of co-resident software, termed a virtual machine monitor (VMM). The VMM may allocate host machine resources dynamically and transparently among the multiple VMs so that their respective guest operating systems may run one or more vCPUs concurrently on a single physical machine.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
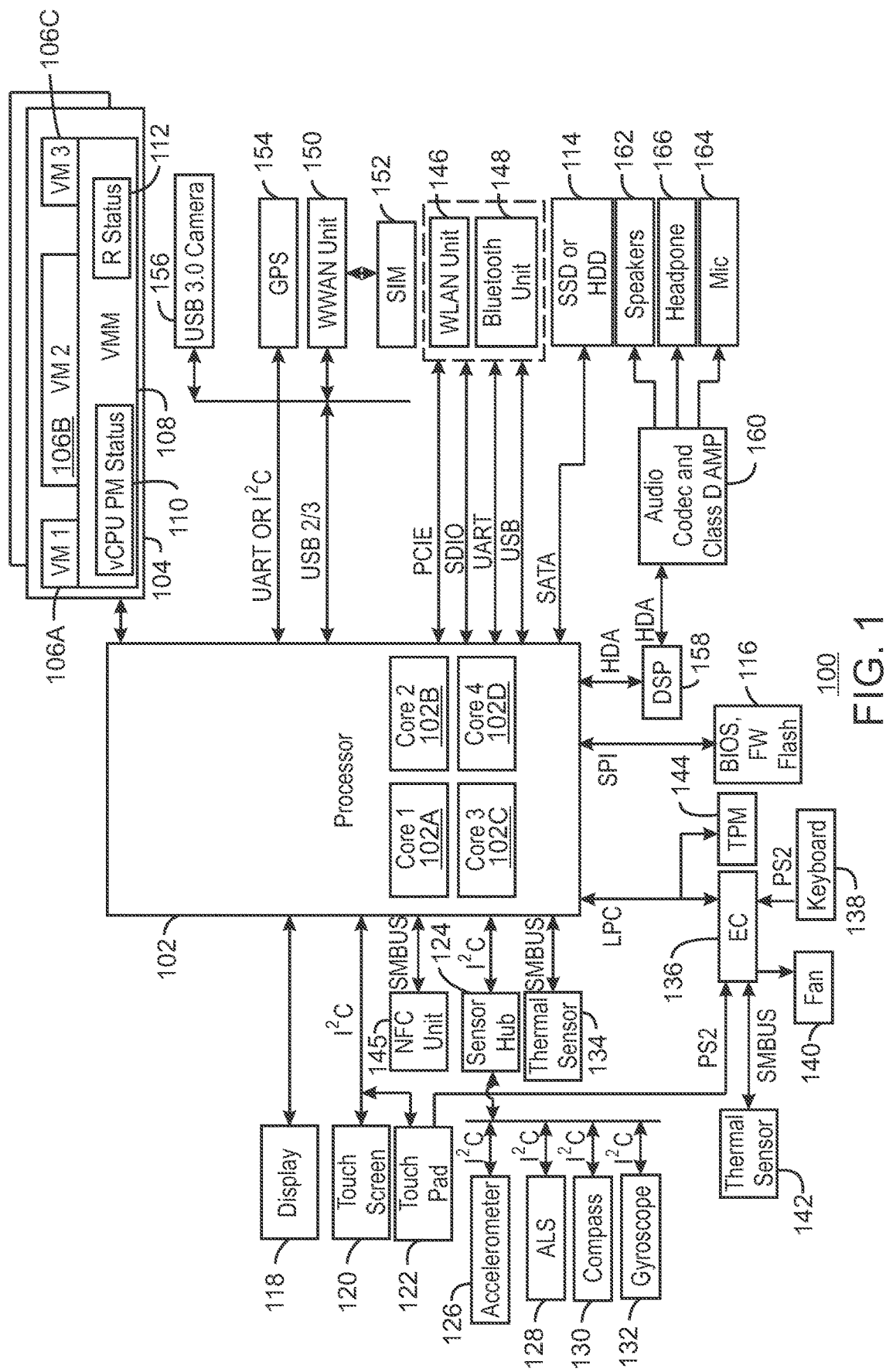
FIG. 1 is a block diagram of components that may be present in an example computing device.

Mobile platform virtualization technology allows multiple virtual machines (VMs) and operating systems to share hardware resources, such as physical CPUs, memory, I/O, and the like. Mobile virtualization is becoming popular as mobile platforms need to accommodate various applications and services, such as security and location. It is increasingly common as platforms advance to having more powerful system resources, such as multiple CPU cores, GPUs, larger amounts of memory, and faster input/output (I/O).

While mobile platform virtualization offers many benefits, including performance, cost, security, and the like, it may be problematic for platform power management (PM), as the virtualization adds to the complexity of making PM decisions. This is especially the case when system resources are virtualized and shared among multiple entities or VMs, for example, when virtual CPUs (vCPUs) in a first VM and a second VM share the same physical CPU core (pCPU).

The design of efficient virtualized mobile platform PM faces two main challenges. VMs in a mobile platform are generally isolated from other VMs, and thus, local PM decisions do not account for the status of other VMs. Accordingly, the PM decisions for a VM often cannot be directly translated into hardware power savings. The point of intersection for PM commands in this type of environment is the VMM, which incurs overheads. Further, battery-powered mobile platforms may use fine-grained management of active and idle states to maximize battery life and provide a better user experience. However, the increased overhead from frequent PM requests may limit system performance and scalability.

As an example, in a virtualized mobile platform, each VM makes local PM decisions for its own vCPU, e.g., HALT or MWAIT, and sends those requests to the VMM via a hyper-call without knowing the status of other resource-sharing VMs. Based on the inputs from the VMs, the VMM then makes a final global PM decision. For example, the VMM may issue an MWAIT to the PM agent at the hardware level to translate the PM requests from VM into real core power saving states or sleep states, such as CPU C-states (e.g., C1, C2, C6, etc.), and the like. When system resources, e.g., CPU cores, are shared among multiple VMs, VMs' local PM decision may not be translated into actual hardware power savings without causing high system overheads from hyper-calls to the VMM.

The systems and methods described herein use a distributed and secure PM architecture for virtual platforms that allows VMs to share PM-relevant information via shared memory, a shared memory object, or the like, so that each VM can make more accurate and informed PM decisions without increasing significant system overheads due to increased numbers of hyper-calls.

Secure shared memory objects are used to share PM-related state and decision information, such as VM and vCPU scheduling, interrupts, device and platform PM state, and the like, among the VMM and the VMs that share system resources. With access to this information, the VMs can coordinate PM decisions in a distributed manner without the intervention of the VMM. By doing this, each VM's PM requests can be translated into direct hardware PM requests that are sent to the hardware level without intervention by the VMM.

FIG. 1 is a block diagram of components that may be present in an example computing device 100. The example computing device 100 may include handheld devices, personal computers (PC), computer systems, embedded devices and the like. For example, the computing device 100 may be a cellular phone, a tablet computer, an Internet Protocol device, a digital camera, a personal digital assistant (PDA), or a handheld PC. Embedded devices can include a micro controller, a digital signal processor (DSP), a system on a chip, a network computer (NetPC), a set-top box, a network hub, a wide area network (WAN) switch, or any other system that can use the VM information system described herein.

The components in the computing device 100 may be implemented as integrated circuits (ICs), portions thereof, discrete electronic devices, or other modules, logic, hardware, software, firmware, or a combination thereof adapted in a computer system, or as components otherwise incorporated within a chassis of the computer system. Note also that the block diagram of FIG. 1 is intended to show a high level view of many components of the computer system. However, it is to be understood that some of the components shown may be omitted, additional components may be present, and different arrangement of the components shown may occur in other implementations.

The computing device 100 includes a processor 102 that may be a microprocessor, a multi-core processor, a multi-threaded processor, an ultra-low voltage processor, an embedded processor, or other known processing element. In the illustrated example, the processor 102 acts as a main processing unit and central hub for communication with many of the various components of the computing device 100. In one example, the processor 102 is implemented as a system on a chip (SoC). The processor 102 may be an Intel® Architecture Core™-based processor such as a Quark™, an Atom™, i3, i5, i7 or another such processor available from Intel Corporation, Santa Clara, Calif. However, it may be noted that other low power processors, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may be used. In some examples, the processor may be an Apple A5, Ax, or similar processor, a Qualcomm Snapdragon processor, or TI OMAP processor.

In this example, the processor 102 is a multicore processor that includes four cores 102A-102D, termed pCPUs herein. In other examples, the processor 102 may have more cores, such as eight cores, or more. The techniques described herein allow operating systems (OS's) in VMs running in the computing device 100 to be configured to coordinate power management (PM) commands, for example, allowing them to cooperatively issue PM commands directly to system resources.

The processor 102 communicates with a system memory 104. The system memory 104 may be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (Q17P). These devices, in some embodiments, are directly soldered onto a motherboard to provide a lower profile solution, while in other embodiments the devices are configured as one or more memory modules that in turn couple to the motherboard by a given connector. Other memory implementations may be used such as other types of memory modules, e.g., dual inline memory modules (DIMMs) of different varieties including but not limited to microDIMMs, MiniDIMMs. The memory may be sized between 2 GB and 32 GB, or higher, and may be configured as a DDR3LM package or an LPDDR2 or LPDDR3 memory that is soldered onto a motherboard via a ball grid array (BGA).

As shown in FIG. 1, the system memory 104 may include VMs that operate the device. In this example, three VMs are included, a modem VM 106A, an app VM 106B, and a security VM 106C. In other examples, fewer or more VMs may be present. A VMM 108 instantiates and provisions the VMs 106A-106C, for example, allocating system and memory resources. The VMM 108 may handle some interactions with the hardware of the computing device 100, while others may be directly operated from the VMs 106A-106C.

In one example, the VMM 108 maintains commonly accessible memory areas that allow communication of the status of the pCPUs 102A-102D to operating systems in the VMs 106A-106C. A first memory area 110 may include a PM status for each of the vCPUs in the VMs, e.g., core sleep state or C-states, core performance state or P-states, and the like. A second memory area 112 may include the access and use status of other resources, such as a display. Other memory areas may be maintained by the VMM 108, as described herein.

To provide for persistent storage of information such as data, applications, one or more operating systems and so forth, a mass storage 114 may also couple to the processor 102, e.g., via a serial ATA (SATA) interface, among others. In various embodiments, to enable a thinner and lighter system design as well as to improve system responsiveness, the mass storage may be implemented via a solid state drive (SSD). However in other embodiments, the mass storage may be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 1, a flash device 116 may be coupled to processor 102, e.g., via a serial peripheral interface (SPI). This flash device may provide for non-volatile storage of system software, including a basic input/output software (BIOS) as well as other firmware of the system.

Various input/output (IO) devices may be present within the computing device 100. For example, a display 118 may be included, which may be a high definition OLED, LCD, or LED panel mounted in a chassis of the computing device 100. The display 118 may be part of a display panel that includes a touch screen 120, e.g., adapted externally over the display 118, such that user inputs can be provided to the system to enable desired operations, e.g., with regard to the display of information, accessing of information and so forth. In one example, the display 118 may be coupled to the processor 102 via a display interconnect that can be implemented as a high performance graphics interconnect. The touch screen 120 may be coupled to processor 102 via another interconnect, which may be an $I^2C$ interconnect. In addition to the touch screen 120, user input may also occur via a touch pad 122 or input buttons. Input buttons, if present, which may be configured to extend outside of the chassis and may also be coupled to the same $I^2C$ interconnect as the touch screen 120.

In various embodiments, the display 118 can be of different sizes, e.g., 3-3.9", 4-4.5", 5-5.5", 11.6", 13.3" or any number of other sizes, and may have a 16:9 aspect ratio. Further, the display 118 may be high definition (HD) resolution, such as 1920×1080p, or higher, be compatible with an embedded display port (eDP), and be a low power panel with panel self-refresh.

The touch screen 120 may be multi-touch capable, for example, a capacitive touch screen 120 enabling two or more simultaneous touch entries. In one example, the touch screen 120 and display 118 are accommodated within a damage and scratch-resistant glass and coating, e.g., Gorilla Glass™ or Gorilla Glass 2™, for low friction to reduce "finger burn" and avoid "finger skipping".

Various sensors may be present within the computing device 100 and may be coupled to processor 102 in different manners. For example, inertial and environmental sensors may couple to processor 102 through a sensor hub 124, e.g., via an I$^2$C interconnect. The sensors may include an accelerometer 126, an ambient light sensor (ALS) 128, a compass 130 and a gyroscope 132. Other environmental sensors may include a thermal sensor 134 that may couple to processor 102 via a system management bus (SMBus) bus.

Various peripheral devices may couple to processor 102, for example, via a low pin count (LPC) interconnect. In the example shown in FIG. 1, components may be coupled through an embedded controller (EC) 136. Such components can include a keyboard 138, e.g., coupled via a PS2 interface, a fan 140, and a thermal sensor 142. In some embodiments, the touch pad 122 may also couple to the EC 136 via a PS2 interface.

A security processor such as a trusted platform module (TPM) 144 in accordance with the Trusted Computing Group (TCG) TPM Specification Version 1.2, dated Oct. 2, 2003, may also couple to processor 102 via the LPC interconnect, or through other interfaces. In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TXT), and Intel® Manageability Engine Technology along with secure user interfaces such as a secure keyboard and display. However, it can be understood that the scope is not limited in this regard and secure processing and storage of secure information may be in another protected location such as a static random access memory (SRAM) in a security coprocessor, or as encrypted data blobs that are only decrypted when protected by a secure enclave (SE) processor mode. In one example described further herein, operation of the security functions may be assigned to a dedicated VM, such as the security VM 106C.

Peripheral ports may be included in the computing device 100, either as individual ports or as a combined port in smaller form factor devices. The peripheral ports may include a high definition media interface (HDMI) connector. Further, USB ports may be included, such as external ports in accordance with the Universal Serial Bus Revision 3.0 Specification (November 2008), for charging of the device. In a larger form factor device, a USB port may be included for charging of other USB devices (such as smartphones) when the system is in Connected Standby state and is plugged into AC wall power. Other ports may include an externally accessible card reader such as an SD-XC card reader and/or a SIM card reader for WWAN identification. For audio, a 3.5 mm jack with stereo sound and microphone capability (e.g., combination functionality) may be present, with support for jack detection (e.g., headphone-only support using a microphone in the device, or a headphone with a microphone in the cable). In some embodiments, the jack can be re-configurable between stereo headphone output and stereo microphone input. Also, a power jack can be provided for coupling to an AC power transformer.

The computing device 100 may communicate with external devices in a variety of manners, including wirelessly. In the example shown in FIG. 1, various wireless modules, each of which can correspond to a radio configured for a particular wireless communication protocol, are present. One type of wireless communication in a short range such as a near field may be via a near field communication (NFC) unit 145 which may communicate with the processor 102 via an SMBus. Note that devices in close proximity to each other can communicate using the NFC unit 145. For example, a user can enable the computing device 100 to communicate with another portable device such as a smartphone by placing the two devices in close proximity and enabling the transfer of information, such as identification information, payment information, image data, and the like. Wireless power transfer may also be performed using a NFC system.

Additional wireless units that may be present in the computing device 100 include other short range wireless engines, such as a WLAN unit 146 and a Bluetooth unit 148. Using the WLAN unit 146, Wi-Fi™ communications in accordance with a the Institute of Electrical and Electronics Engineers (IEEE) 802.11 standard can be realized, while using the Bluetooth unit 148, short range communications via a Bluetooth protocol can occur. These units may communicate with the processor 102, e.g., through a USB link or a universal asynchronous receiver transmitter (UART) link. The units may be coupled to the processor 102 using an interconnect according to a Peripheral Component Interconnect Express™ (PCIe™) protocol, e.g., in accordance with the PCI Express™ Specification Base Specification version 3.0 (published Jan. 17, 2007). Other protocols, such as a serial data input/output (SDIO) standard, may be used.

In addition, wireless wide area communications, e.g., according to a cellular or other wireless wide area protocol, can occur via a WWAN unit 150 which in turn may couple to a subscriber identity module (SIM) 152. In an example, communications, such as via the WWAN unit 150, the WLAN unit 146, or the Bluetooth unit 148, may be handled by a dedicated VM, such as the modem VM 106A.

The computing device 100 may include a GPS module 154 to enable receipt and use of location information. In the example shown in FIG. 1, the WWAN unit 150, the GPS module 154, and an integrated imaging device, such as a camera module 156 may communicate with the processor 102 via a USB protocol such as a USB 2.0 or 3.0 link, or a UART or I$^2$C protocol. In some examples, the WWAN unit 150 may be an integrated device that can provide support for multiple frequencies, such as 3G/4G/LTE and GPS. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

To provide for audio inputs and outputs, an audio processor can be implemented via a digital signal processor (DSP) 158, which may couple to the processor 102 via a high definition audio (HDA) link. Similarly, the DSP 158 may communicate with an integrated coder/decoder and amplifier (CODEC) 160 that may couple to output speakers 162, for example, mounted within the chassis. Similarly, the CODEC 160 can be coupled to receive audio inputs from a microphone 164. Note also that the audio outputs can be provided from the CODEC 160 to a headphone jack 166. Although shown with these particular components in the embodiment of FIG. 1, understand the systems are not limited to these items.

In one example, the CODEC 160 is capable of driving the stereo headphone jack, stereo microphone jack, an internal microphone array and stereo speakers. In other examples, the codec can be integrated into an audio DSP or coupled via an HD audio path to a peripheral controller hub (PCH).

Figure 2:
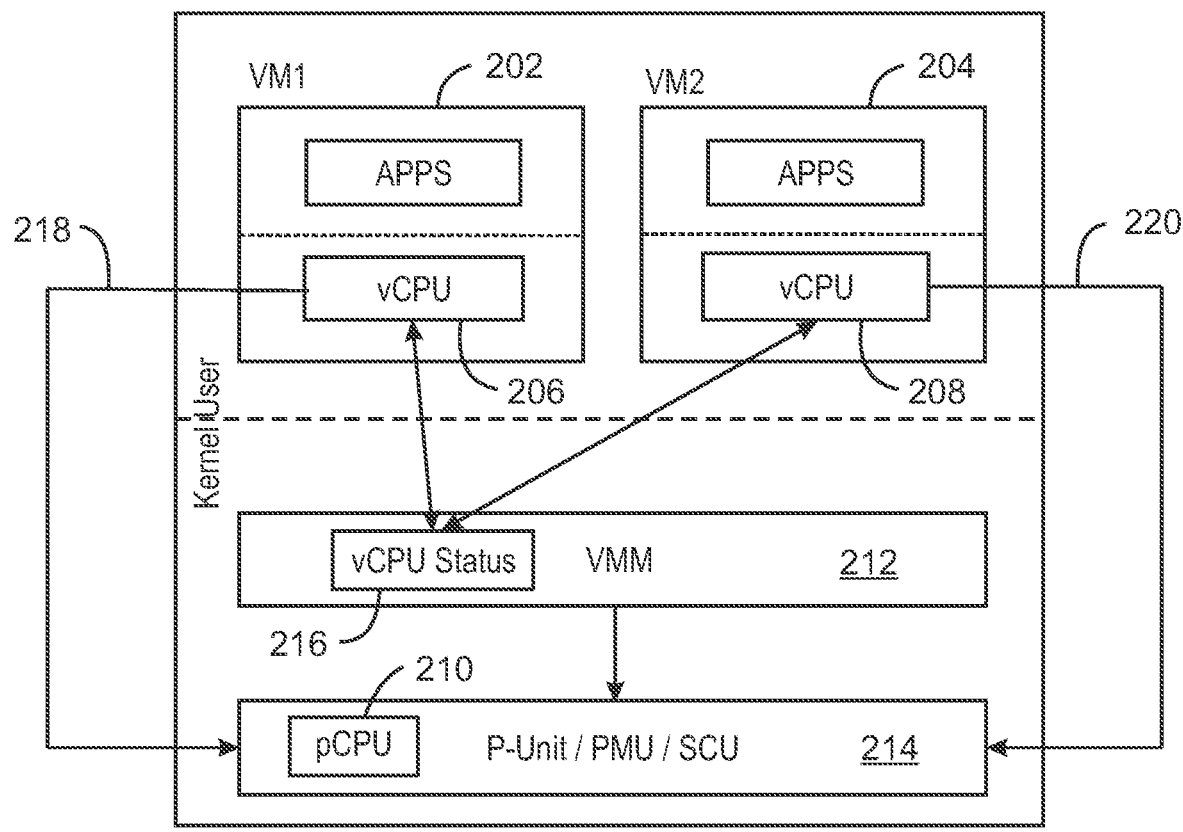
FIG. 2 is a schematic diagram of an example of the operation of a coordinated power management by two virtual machines (VMs) that share a pCPU.

FIG. 2 is a schematic 200 of an example of the operation of a coordinated power management by two virtual machines (VMs) that share a pCPU. However, the techniques herein are not limited to managing PM commands for shared pCPUs, but may be used to share power management responsibilities for any resource shared by VMs.

In the schematic 200, a first VM 202 and a second VM 204 each have a vCPU 206 or 208 that are sharing a single pCPU 210. As described herein, in earlier implementations each VM 202 or 204 was unaware of the other VM 204 or 202, and any PM changes for a vCPU 206 or 208 would be directed to the VMM 212. The VMM 212 would then collate those changes, and direct the power management unit (PMU) or system control unit (SCU) to make the appropriate changes at the hardware level 214. This added significant overhead to the device in terms of hyper-calls to the VMM 212, VMExits, and the like.

In the present techniques, a memory location 216 may be provided in the VMM 212 to record the power status for each of the vCPUs 206 and 208. The memory location 216 may be accessible to all vCPUs 206 that share a resource, such as the pCPU 210. When a VM 202 or 204 is ready to place a vCPU 206 or 208 in an idle configuration, it may check the memory location 216 to determine the PM status of the other VMs sharing that resource. If the other unit, such as vCPU 208 or 206 is already in an idle configuration, or in another compatible PM state, the VM 202 or 204 may directly issue a PM command 218 or 220 to the PMU or SCU at the hardware level 214 to place the corresponding shared resource, such as the pCPU 210, in the appropriate PM state, for example, as described with respect to the PM decision module 324 of FIG. 3.

Accordingly, the techniques described herein enable "distributed" PM activities in which the PM command 218 or 220 from the VMs 202 and 204 may not need to be intercepted, validated and consolidated by the VMM 212. The memory location 216 provides each VM 202 and 204 with access to information that may be used to make globally-optimal PM decisions. Thus, the PM command 218 and 220 may be delivered directly to PM units at the hardware level 214, such as the pCPU 210, PMU, SCU, or others, as if the issuing VM 202 or 204 has an exclusive access to the system resource (e.g., CPU core).

The memory location 216 may be allocated by the VMM 212 at the time the VMs 202 and 204 are initialized, and re-configured dynamically as the topology and resource allocation of the VMs 202 and 204, such as the mapping of vCPUs to pCPUs, changes over time. Only trusted entities, such as PM logic in a guest kernel driver in the VMs 202 or 204, are allowed to access the memory location 216.

As noted, the techniques are both more efficient and more accurate than solutions implemented by the VMM 212. In solutions implemented by the VMM 212, the local PM decisions, e.g., made by the VMs 202 and 204, may not be accurate due to the lack of a global view. Further, PM requests made by individual VMs 202 and 204 create an unnecessarily large volume of hyper-calls, VMExits, context switches, etc., which may be problematic in battery-operated mobile platforms that use efficient management of power consumption. By sharing PM information among VMs 202 and 204 in the secured shared memory, the techniques empower individual VMs 202 and 204 to make accurate PM decisions. These PM decisions may then be directly delivered to hardware PM units without the need for intervention by the VMM 212, providing better system performance, energy efficiency and scalability.

Figure 3:
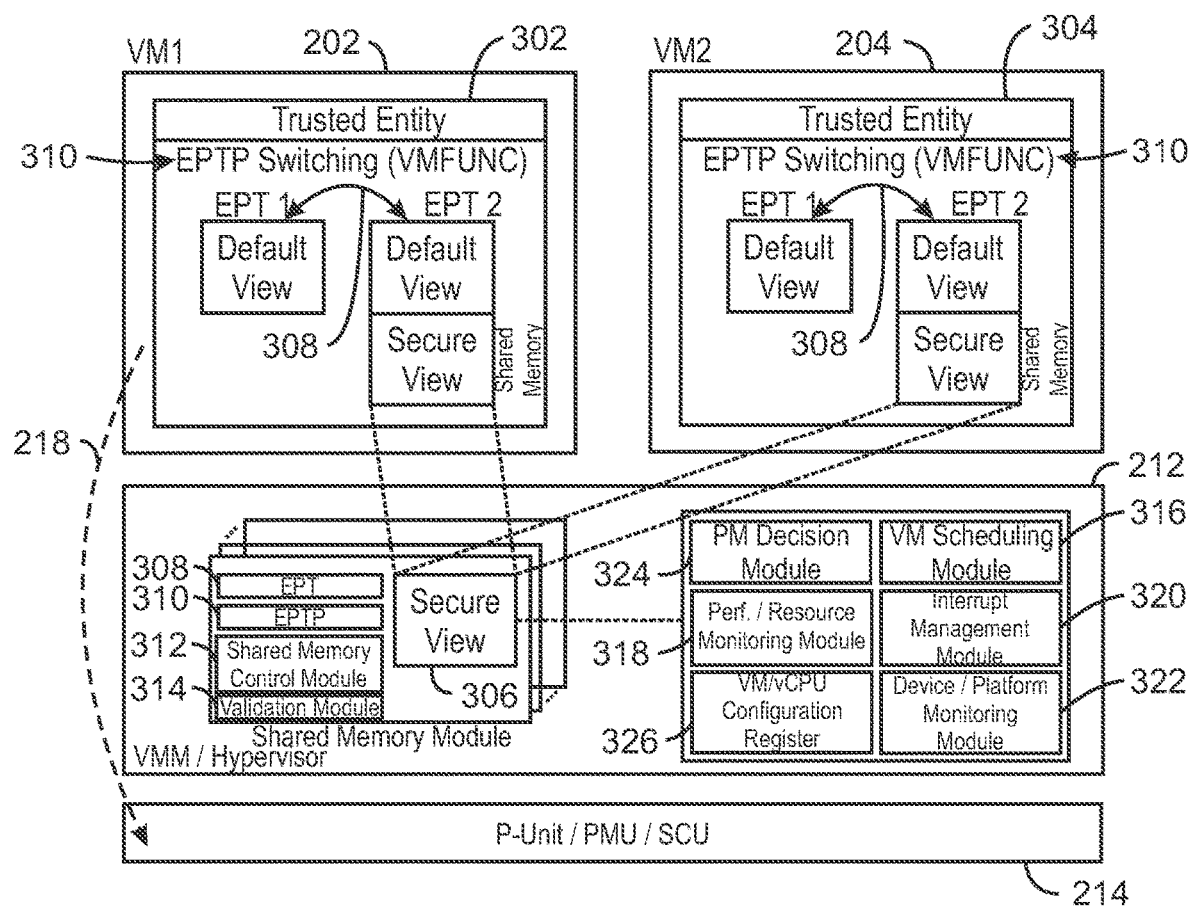
FIG. 3 is a schematic of an example of a shared memory object for VMs to share operating and scheduling information.

FIG. 3 is a schematic of an example 300 of a shared memory object for VMs 202 and 204 to share operating and scheduling information. Like numbered items are as described with respect to FIG. 2. In this example 300, each of the VMs 202 and 204 includes a trusted entity 302 and 304, such as PM logic. The trusted entities 302 and 304 may access a secured shared memory object 306 via extended page table (EPT) pointer switching 308. In EPT pointer switching 308, EPT pointer (EPTP) switching 310 may be performed using special process instructions, such as VMFUNC. The VMFUNC instruction allows a code in a guest VM to load a new value for an EPT pointer, allowing a different page to be viewed without issuing a hyper-call to the VMM 212.

In this example, the VMM 212 creates the shared memory object 306 for the VMs 202 and 204 to share PM-relevant information. This allows the trusted entities 302 and 304 in the VMs 202 and 204 to access the share memory object 306 in a secure manner, make an optimal, VM-wide PM decision, and directly issue a PM command 218 to the PM entities at the hardware level 214, without intervention by the VMM 212, thus lowering system overheads due to hyper-calls, VMExits, context switches, and the like.

The shared memory object 306 may be either created and configured by the VMM 212, for example, using a shared memory control module 312, during initialization of the VMs 202 and 204, or created upon request from a VM 202 or 204, e.g., using a hyper-call. If a VM 202 and 204 requests the VMM 212 to create a shared memory object 306, the VMM 212 will validate the trustworthiness of the request before creating one, for example, using a validation module 314. The VMM 212 may create multiple instances of a shared memory object 306 so that the VMs 202 or 204 that share the same system resource, such as a pCPU core, can share PM-related information. The shared memory object 306 may contain any data structure, including a bit-flag register, an array, or any other structure, to store PM-related information provided by VMs 202 and 204 and the VMM 212.

The shared memory objects 306 can be dynamically removed, created, or reconfigured as the system configuration changes, e.g., due to changes in VM topology, vCPU-pCPU mapping, VM creation, VM deletion, or VM migration, and the like. For each shared memory object 306, the VMM 212 may allow different access rights to different VMs 202 and 204, such as read, write, or execute, for the entire shared memory object 306 or for a portion of the shared memory object 306. For example, for the portion of a shared memory object 306 that provides status information for VM1 202, the VMM 212 may allow read/write access to VM1 212 and the VMM 212, read-only access to other VMs, such as VM2 204, that share the same pCPU with VM1 202, and no read/write access to other VMs that do not share the resource.

The shared memory object 306 may include any number of flags, variables, and code segments that may be used by the VMs 202 and 204 to share information for making operational decisions. These may include, for example, memory segments that store information on system performance and resource utilization, such as hardware (HW) performance counters, device and platform PM status and configurations, VM interrupts, VM scheduling, and a PM decision module.

A VM/vCPU scheduling module 316 in the VMM 212 may be used to provide scheduling information and code, including algorithms, load balancing, priority, pre-emption, and the like, that may be used by the VMs 202 and 204 to understand the actual use of the physical CPU cores among VMs and vCPUs.

A performance and resource utilization module 318 in the VMM 212 may provide pCPU, platform performance, and utilization information that may be used as a guide when vCPUs and VMs make local PM decisions. For example, even if the VM1 202 observes a long idle duration opportunity, if the shared pCPU is highly utilized by other VMs, such as VM2 204, VM1 202 may adjust its PM decision accordingly.

An interrupt management module 320 in the VMM 212 shares virtual interrupt status information among VMs so that each VM 202 and 204 may observe any currently pending interrupts and better predict future resource requirements in its PM decisions, such as entering different CPU core sleep states (e.g., C6) or platform sleep states (e.g., S0ix, S3, etc.).

A device and platform monitoring module 322 in the VMM 212 may maintain and share the current device and platform states, including PM states such as D0/Dx, S0ix, and the like, to VMs 202 and 204. Further, these states may be shared with other components in the VMM 212, such as a PM decision module 324. Power status for other shared resources, such as displays, and the like, may also be maintained and shared by the device and platform monitoring module 322.

A VM/vCPU configuration register 326 may dynamically re-configure the VM/vCPU PM settings based on information provided by the other modules inside the VMM 212. For example, it may expose or hide certain sleep states, such as Cx, from a specific VM 202 or 204 depending on its efficiency and other contexts. If a vCPU repeatedly requests a deeper sleep state, such as C6, but only enters shallower states due to activity or dependencies in other VMs 202 or 204, then the VMM 212 may temporarily hide deep sleep-states, e.g., C6, from the vCPU so that it cannot issue the C6 request.

In some examples, the PM decision module 324 in the VMM 212 may make a final PM decision based on PM requests from individual VMs 202 and 204, and make the final decision visible for the VMs 202 and 204. This may be used when the individual VMs 202 or 204 cannot make a final PM decision or has additional checks or validation of local PM commands. For example, a VM can request CPU sleep states, e.g., CPU core C-states. However, the VM may not be able to control platform sleep states because it may not have PM state information about other, non-shared pCPUs. Thus, the PM Decision Module 324 may ensure that the platform enters an appropriate sleep state, e.g., S0ix, S3, etc., when all the pCPU and other devices are in deep enough sleep state, e.g., C6, to enter platform-level sleep states. Such platform level decision may not be made by individual vCPU/VM because they may not have the PM state information of pCPUs that only belong to other VMs in their shared memory objects 306. Device state information, such as Dx states, can be monitored by the Device/Platform Monitoring Module 322, and used by the PM Decision Module 324 in entering platform sleep states. Further, local PM logic, e.g., in trusted entities 302 and 304, in each VM 202 and 204 can use the decision from the VMM 212 as a guide or feedback for the decision making process.

An individual vCPU/VM may be allowed to make broader platform sleep state decisions and issue such commands directly to PM agents, e.g., the PMU, if the VMM shares all the pCPU PM state and device PM state information with all of the vCPUs regardless of the pCPU-vCPU mapping. For example, if the VMs have read access rights to the pCPUs and device information for both shared and unshared pCPUs and devices. In this example, upon determining that the current resources are no being utilized, the vCPU may issue pCPU sleep states, e.g., C-states, and may also issue platform sleep states, e.g., S-states (S0ix, S3, etc.). In this example, the information described with respect to the memory location 216 of FIG. 2, would include all pCPU PM information and device PM states.

Figure 4:
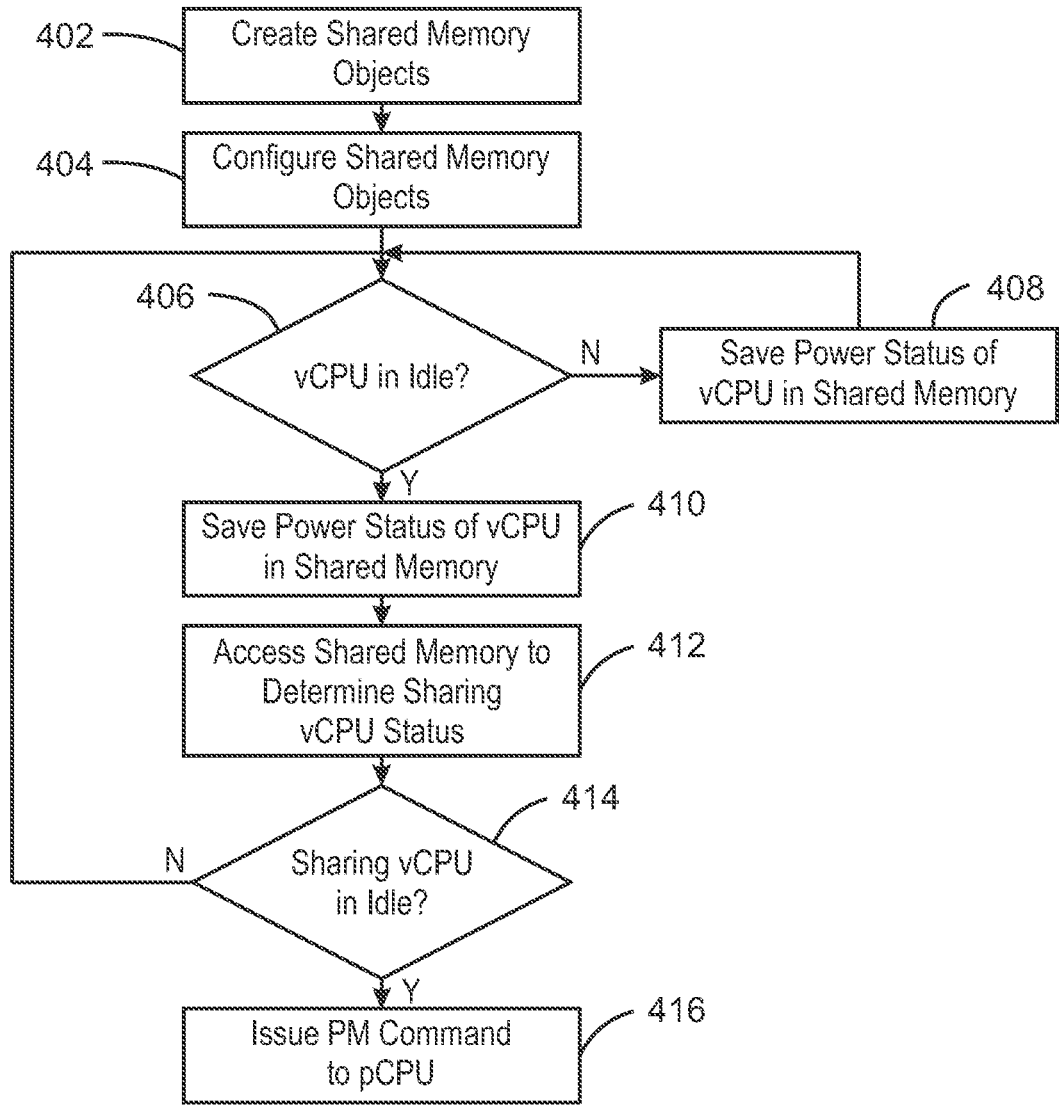
FIG. 4 is a block diagram of an example method 400 for VMs to cooperatively coordinate power management activities using a shared memory space.

FIG. 4 is a block diagram of an example method 400 for VMs to cooperatively coordinate power management activities using a shared memory space. The method 400 begins at block 402, with the creation of the shared memory objects. As described herein, the VMM may create these objects upon initialization of the VMs, upon request of the VMs, or when a configuration change occurs. At block 404, the shared memory objects may be configured, for example, to indicate VMs that are sharing resources, such as vCPUs in different VMs that are sharing a single pCPU, and the like.

At block 406, a determination is made as to whether a vCPU is requesting an idle or other low power management state. If not, the current power state may be saved in the shared memory object at block 408.

If at block 406, the vCPU is requesting a lower power status, at block 410, the requested power status is saved to the shared memory object. At block 412, the VM of the vCPU accesses the shared memory object to determine the status of other vCPUs that are sharing the pCPU. If the other vCPU, or vCPUs, sharing the pCPU are active, process flow returns to block 406.

If, at block 414, the other vCPUs sharing the pCPU are determined to also be in a compatible low power or idle state, at block 416, a PM command is issued to the hardware level by the VM to change the PM state of the pCPU. It may be understood that the method 400 described is not limited to pCPUs that are shared by the vCPUs in the VMs, but may be used to reduce power consumption by other shared system resources. For example, if two VMs are sharing the display screen, and the activities for one of the VMs ends, it may check the shared memory object to see if the other VM is still using the display. If not, the VM may issue a PM command to the hardware level to turn the display off.

Figure 5:
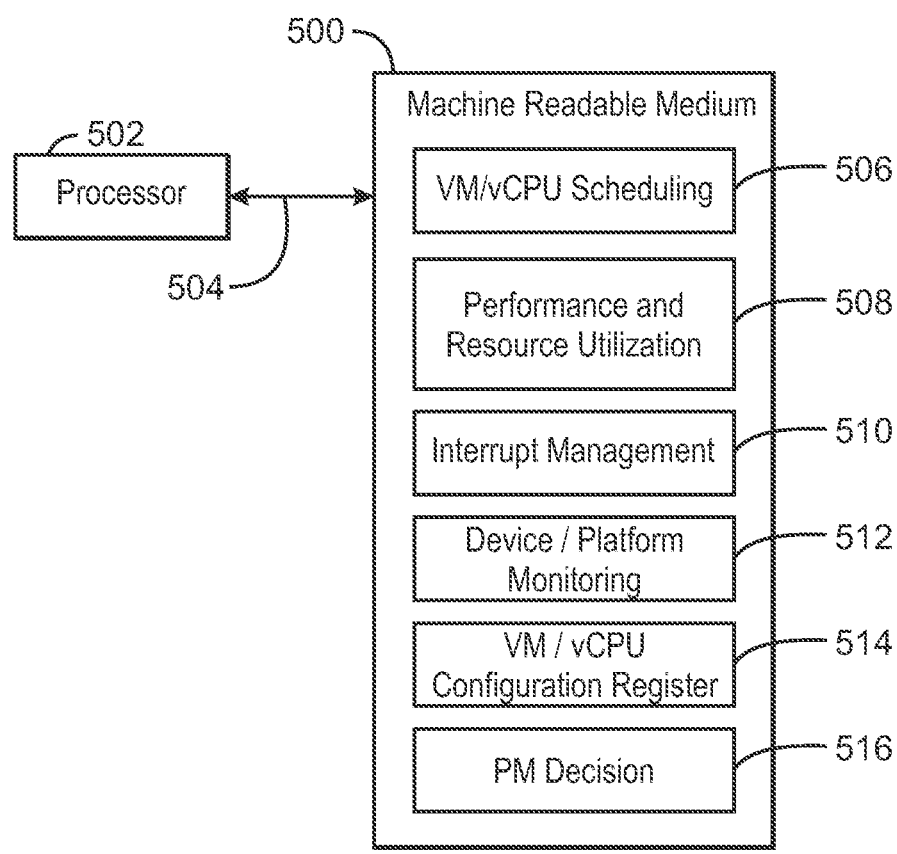
FIG. 5 is a block diagram of an example of a non-transitory machine readable medium including code for directing one or more processors to cooperatively coordinate power management activities between vCPUs.

FIG. 5 is a block diagram of an example of a non-transitory machine readable medium 500 including code for directing one or more processors to cooperatively coordinate power management activities between vCPUs. The non-transitory machine readable medium 500 is accessed by a processor 502 over a bus 504. In this example, the processor 502 may be a vCPU accessing the non-transitory machine readable medium 500 over a virtual bus in a VMM.

The non-transitory machine readable medium 500 comprises a number of code blocks used to implement the functionality described herein. These code blocks may include a code block 506 to direct the processor 502 to analyze the use of the physical CPU cores, or other resources, by the vCPUs to schedule the PM states. A code block 508 may be included to direct the processor 502 to provide pCPU, platform performance, and utilization information that may be used when vCPUs and VMs make local PM decisions. A code block 510 may be included to direct the processor 502 to share virtual interrupt status information among vCPUs/VMs. A code block 512 may be included to direct the processor 502 to share the current device and platform states. A code block 514 may be included to direct the processor 502 to dynamically re-configure and optimize the VM/vCPU PM settings based on information provided by the VMM.

Further, a code block 516 may be included to direct the processor 502 to make a final PM decision based on PM requests from individual VMs, and make the final decision visible for the VMs, for example, when the individual VMs cannot make a final PM decision or has additional checks or validation of local PM commands.

EXAMPLES

Example 1 provides an apparatus that includes a computing device. The computing device includes a plurality of virtual machines (VMs), each sharing a resource with another of the plurality of VMs. The computing device includes a virtual machine monitor (VMM) that includes a shared memory object accessible by the plurality of VMs, wherein the shared memory object includes a current power state requested by a VM for the resource.

Example 2 includes the subject matter of example 1. In this example, the shared memory object can be switched between each of the plurality of VMs.

Example 3 includes the subject matter of either of examples 1 or 2. In this example, the computing device includes a processor that includes a plurality of physical processors (pCPUs), wherein the resource includes one of the plurality of pCPUs. The shared memory object includes a power state of a vCPU that shares the one of the plurality of pCPUs with at least one other vCPU.

Example 4 includes the subject matter of any of examples 1 to 3. In this example, the power state includes a CPU core active state, a core sleep state, or a performance state, or any combinations thereof.

Example 5 includes the subject matter of any of examples 1 to 4. In this example, the power state includes an active indication.

Example 6 includes the subject matter of any of examples 1 to 5. In this example, the VMM includes a power management module to place a pCPU, a platform, or both in a low power state, and a device and platform monitoring module.

Example 7 includes the subject matter of any of examples 1 to 6. In this example, at least one of the plurality of VMs includes power management logic to directly place a pCPU in a low power state.

Example 8 includes the subject matter of any of examples 1 to 7. In this example, an operating system in a VM is to dynamically adjust task allocation according to an availability of the plurality of pCPUs.

Example 9 includes the subject matter of any of examples 1 to 8. In this example, the computing device includes a display shared by two or more of the plurality of VMs, and the shared memory object includes a current power state requested by one of the plurality of VMs sharing the display.

Example 10 includes the subject matter of any of examples 1 to 9. In this example, the VMM includes a shared memory control module to create the shared memory object for access by the plurality of VMs.

Example 11 includes the subject matter of any of examples 1 to 10. In this example, the VMM includes a shared memory control module to configure the shared memory object for access by the plurality of VMs.

Example 12 includes the subject matter of any of examples 1 to 11. In this example, the VMM includes a validation module to determine if a request from one of the plurality of VMs to create the shared memory object is trustworthy.

Example 13 provides a method for coordinating power management by virtual machines. The method includes changing a power management (PM) status in a virtual machine (VM) for a resource shared by another VM, saving the PM status to a shared memory object in a virtual machine manager (VMM), and accessing the shared memory object to determine a current PM status of the other VM for the shared resource. If the other VM has a compatible PM status, a PM command is sent from the VM to a hardware level to be implemented on the shared resource.

Example 14 includes the subject matter of example 13. In this example, the method includes changing a vCPU from an active state to an idle state.

Example 15 includes the subject matter of either of examples 13 or 14. In this example, the method includes a VM sending the PM command to change a PM state for a pCPU based, at least in part, on a PM state of two or more vCPUs sharing the pCPU.

Example 16 includes the subject matter of any of examples 13 to 15. In this example, the method includes accessing the shared memory object to determine if the other VM is currently using a display, and sending a PM command from the VM to turn off the display based, at least in part, on a determination that the other VM sharing the display is no longer using the display.

Example 17 includes the subject matter of any of examples 13 to 16. In this example, the method includes creating the shared memory object by the VMM, wherein the shared memory object comprises the PM status for a shared resource and allowing the VM and the other VM to access the shared memory object.

Example 18 includes the subject matter of any of examples 13 to 17. In this example, the method includes determining in the VMM that a configuration of the shared resources between the VM and the other VM has changed, and reconfiguring the shared memory object to match the changed configuration of the shared resources between the VM and the other VM.

Example 19 provides a non-transitory machine-readable medium comprising instructions, which when executed by one or more processors, cause the one or more processors to perform any of the methods of claims 13 to 18.

Example 20 provides an apparatus comprising means for performing any of the methods of claims 13 to 18.

Example 21 provides a non-transitory machine-readable medium, comprising instructions, which when executed by a processor, cause the processor to share a power management (PM) state.

Example 22 includes the subject matter of example 21. In this example, the non-transitory machine-readable medium includes instructions, which when executed by a processor, cause the processor to save information on the PM state of pCPUs, displays, or shared resources, or any combinations thereof, to a shared memory object for access by a VM.

Example 23 includes the subject matter of either of examples 21 or 22. In this example, the non-transitory machine-readable medium includes instructions, which when executed by a processor, cause the processor to analyze usage of resources by VMs to schedule the PM state.

Example 24 includes the subject matter of any of examples 21 to 23. In this example, the non-transitory machine-readable medium includes instructions, which when executed by a processor, cause the processor to share virtual interrupt status information among vCPUs in VMs.

Example 25 includes the subject matter of any of examples 21 to 24. In this example, the non-transitory machine-readable medium includes instructions, which when executed by a processor, cause the processor to dynamically re-configure PM settings based on information provided by modules in a VMM.

Example 26 includes the subject matter of any of examples 21 to 25. In this example, the non-transitory machine-readable medium includes instructions, which when executed by the one or more processors, cause a VM to access a shared memory object, determine a PM status of another VM, and issue a PM command directly to a hardware level of a device.

Example 27 includes the subject matter of any of examples 21 to 26. In this example, the non-transitory machine-readable medium includes instructions, which when executed by the one or more processors, cause a VMM to make a final PM decision based on PM requests from individual VMs.

Example 28 provides a mobile computing device. The mobile computing device includes a plurality of virtual machines (VMs), each sharing a resource with another of the plurality of VMs and a virtual machine monitor (VMM) comprising a shared memory object accessible by the plurality of VMs, wherein the shared memory object comprises a current power state requested by a VM for the resource.

Example 29 includes the subject matter of example 28. In this example, the shared memory object can be switched between each of the plurality of VMs.

Example 30 includes the subject matter of either of examples 28 or 29. In this example, the mobile computing device includes a processor system that comprises a plurality of physical processors (pCPUs), and the resource comprises one of the plurality of pCPUs. The shared memory object includes a power state of a vCPU that shares the one of the plurality of pCPUs with at least one other vCPU.

Example 31 includes the subject matter of any of examples 28 to 30. In this example, the power state includes a CPU core active state, a core sleep state, or a performance state, or any combinations thereof.

Example 32 includes the subject matter of any of examples 28 to 31. In this example, the power state includes an active indication.

Example 33 includes the subject matter of any of examples 28 to 32. In this example, the VMM includes a power management module to place a pCPU, a platform, or both in a low power state, and a device and platform monitoring module.

Example 34 includes the subject matter of any of examples 28 to 33. In this example, at least one of the plurality of VMs includes power management logic to directly place a pCPU in a low power state.

Example 35 includes the subject matter of any of examples 28 to 34. In this example, an operating system in a VM is to dynamically adjust task allocation according to an availability of each of the plurality of pCPUs.

Example 36 includes the subject matter of any of examples 28 to 35. In this example, comprising a display shared by two or more of the plurality of VMs, wherein the shared memory object comprises a current power state requested by a VM for the display.

Example 37 includes the subject matter of any of examples 28 to 36. In this example, the VMM comprises a shared memory control module to create the shared memory object for access by the plurality of VMs.

Example 38 includes the subject matter of any of examples 28 to 37. In this example, the VMM comprises a shared memory control module to configure the shared memory object for access by the plurality of VMs.

Example 39 includes the subject matter of any of examples 28 to 38. In this example, the VMM comprises a validation module to determine if a request from one of the plurality of VMs to create the shared memory object is trustworthy.

Example 40 provides an apparatus including a computing device. The computing device includes a plurality of virtual machines (VMs), each sharing a resource with another of the plurality of VMs, and a means for sharing a current power state requested by a VM for the resource.

Example 41 includes the subject matter of example 40. In this example, the computing device comprises a means for sharing a power state of a vCPU.

Example 42 includes the subject matter of any of examples 40 to 41. In this example, the VMM comprises a means for placing a pCPU in a low power state.

Example 43 includes the subject matter of any of examples 40 to 42. In this example, at least one of the plurality of VMs includes a means for placing a pCPU in a low power state.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the techniques. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. An apparatus comprising a computing device, comprising:
   a plurality of virtual machines (VMs), each sharing a resource with another of the plurality of VMs; and
   a virtual machine monitor (VMM) comprising a shared memory object accessible by the plurality of VMs, wherein the shared memory object comprises a current power state requested by a virtual machine (VM) for the resource, wherein the VM sends a power management (PM) command to change a power state for a physical CPU (pCPU) based, at least in part, on the current power state of two or more virtual CPUs (vCPUs) sharing the pCPU.

2. The apparatus of claim 1, wherein the shared memory object can be switched between each of the plurality of VMs.

3. The apparatus of claim 1, comprising a processor that comprises a plurality of physical processors (pCPUs), wherein the resource comprises one of the plurality of pCPUs and the shared memory object comprises a power state of a vCPU that shares the one of the plurality of pCPUs with at least one other vCPU.

4. The apparatus of claim 3, wherein the power state comprises a CPU core active state, a core sleep state, or a performance state, or any combinations thereof.

5. The apparatus of claim 3, wherein the power state comprises an active indication.

6. The apparatus of claim 3, wherein the VMM comprises:
   a power management module to place a pCPU, a platform, or both in a low power state; and
   a device and platform monitoring module.

7. The apparatus of claim 3, at least one of the plurality of VMs comprising power management logic to directly place a pCPU in a low power state.

8. The apparatus of claim 3, wherein an operating system in the VM is to dynamically adjust task allocation according to an availability of the plurality of pCPUs.

9. The apparatus of claim 1, comprising a display shared by two or more of the plurality of VMs, wherein the shared memory object comprises the current power state requested by one of the plurality of VMs sharing the display.

10. The apparatus of claim 1, the VMM comprising a shared memory control module to create the shared memory object for access by the plurality of VMs.

11. The apparatus of claim 1, the VMM comprising a shared memory control module to configure the shared memory object for access by the plurality of VMs.

12. The apparatus of claim 10, the VMM comprising a validation module to determine if a request from one of the plurality of VMs to create the shared memory object is trustworthy.

13. A method for coordinating power management by virtual machines comprising:
    changing a power management (PM) status in a virtual machine (VM) for a resource shared by another VM;
    saving the PM status to a shared memory object in a virtual machine manager (VMM);
    accessing the shared memory object to determine a current PM status of the other VM for the shared resource; and, if the other VM has a compatible PM status; and
    sending a PM command from the VM to a hardware level to be implemented on the shared resource, wherein the PM command changes a PM state for a physical CPU (pCPU) based, at least in part, on a PM state of two or more virtual CPUs (vCPUs) sharing the pCPU.

14. The method of claim 13, comprising changing a vCPU from an active state to an idle state.

15. The method of claim 13, comprising:
    accessing the shared memory object to determine if the other VM is currently using a display; and
    sending the PM command from the VM to turn off the display based, at least in part, on a determination that the other VM sharing the display is no longer using the display.

16. The method of claim 13, comprising:
    creating the shared memory object by the VMM, wherein the shared memory object comprises the PM state for a shared resource; and
    allowing the VM and the other VM to access the shared memory object.

17. The method of claim 13, comprising:
    determining in the VMM that a configuration of the shared resource between the VM and the other VM has changed; and
    reconfiguring the shared memory object to match the changed configuration of the shared resource between the VM and the other VM.

18. At least one non-transitory machine-readable medium, comprising instructions, which when executed by a processor, cause the processor to:
    share a power management (PM) state between two or more virtual machines (VMs) sharing a pCPU; and
    send a PM command from a VM to change the PM state for the pCPU based, at least in part, on the PM state of the two or more vCPUs sharing the pCPU.

19. The at least one non-transitory machine-readable medium of claim 18, comprising instructions, which when executed by a processor, cause the processor to save information on a PM state of pCPUs, displays, or shared resources, or any combinations thereof, to a shared memory object for access by the two or more VMs.

20. The at least one non-transitory machine-readable medium of claim 18, comprising instructions, which when executed by a processor, cause the processor to analyze usage of resources by the two or more VMs to schedule the PM state.

21. The at least one non-transitory machine-readable medium of claim 18, comprising instructions, which when executed by a processor, cause the processor to share virtual interrupt status information among vCPUs in the two or more VMs.

22. The at least one non-transitory machine-readable medium of claim 18, comprising instructions, which when executed by a processor, cause the processor to dynamically re-configure PM settings based on information provided by modules in a VMM.

23. The at least one non-transitory machine-readable medium of claim 18, comprising instructions, which when executed by the processor, cause a first VM to access a shared memory object, determine a PM status of a second VM, and issue a PM command directly to a hardware level of a device.

24. The at least one non-transitory machine-readable medium of claim 18, comprising instructions, which when executed by processor, cause a VMM to make a final PM decision based on PM requests from the two or more VMs.

* * * * *